Oct. 30, 1928.　　　　　　　　　　　　　　　　　1,689,407
A. H. SKAER ET AL
MOUNTING FOR DRUMS AND THE LIKE
Filed Sept. 30, 1922　　　2 Sheets-Sheet 1

Inventors
Arthur H. Skaer
Theodore E. Barker
Omar E. Clark

Oct. 30, 1928.　　　　　　　　　　　　　　　1,689,407
A. H. SKAER ET AL
MOUNTING FOR DRUMS AND THE LIKE
Filed Sept. 30, 1922　　　　　2 Sheets-Sheet 2
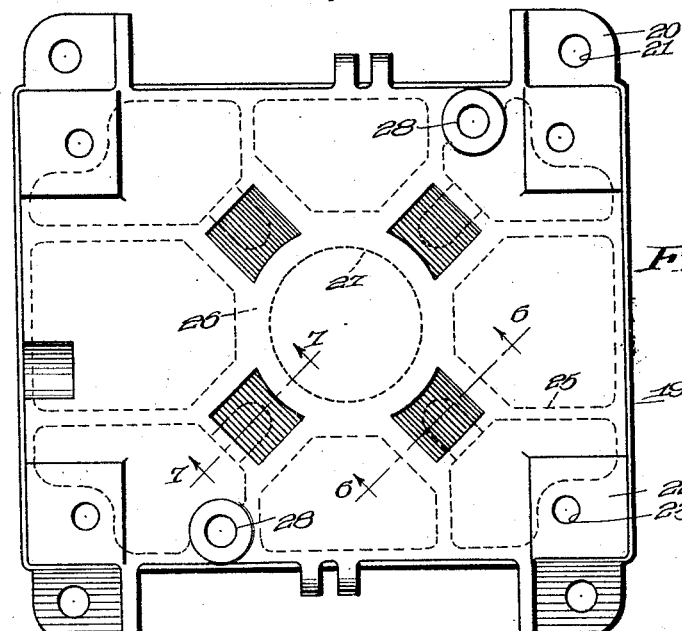
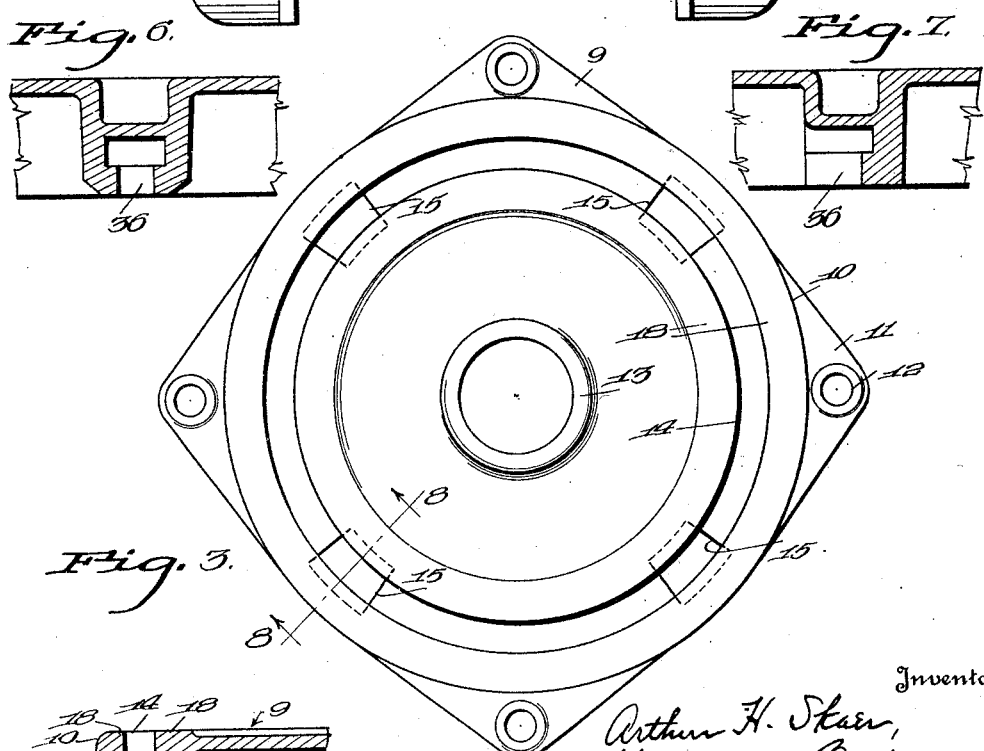

Patented Oct. 30, 1928.

1,689,407

UNITED STATES PATENT OFFICE.

ARTHUR H. SKAER, THEODORE E. BARKER, AND OMAR E. CLARK, OF DENVER, COLORADO, ASSIGNORS, BY MESNE ASSIGNMENTS, TO THE GARDNER-DENVER COMPANY, OF QUINCY, ILLINOIS, A CORPORATION OF DELAWARE.

MOUNTING FOR DRUMS AND THE LIKE.

Application filed September 30, 1922. Serial No. 591,675.

The present invention relates to mountings for winding drums and machinery of this character, particularly those of a relatively light type, such as are used in and around mines.

The object is to provide a simple and effective turntable structure, one member of which may be employed separately for mounting on a column or column arm.

The preferred embodiment of the invention is illustrated in the accompanying drawings, wherein:—

Figure 2 is a plan view of the carrier member,

Figure 3 is a plan view of the base member,

Figure 5:
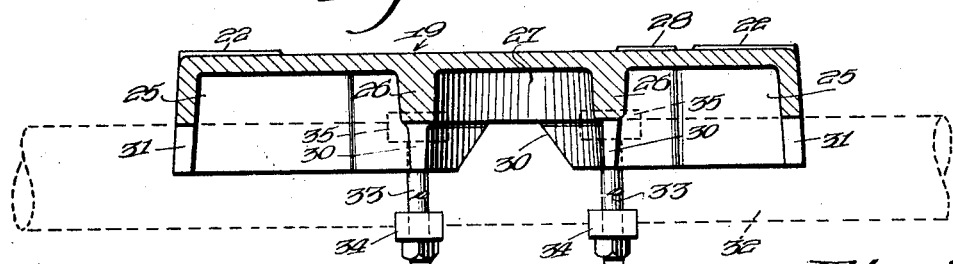
Figure 4:
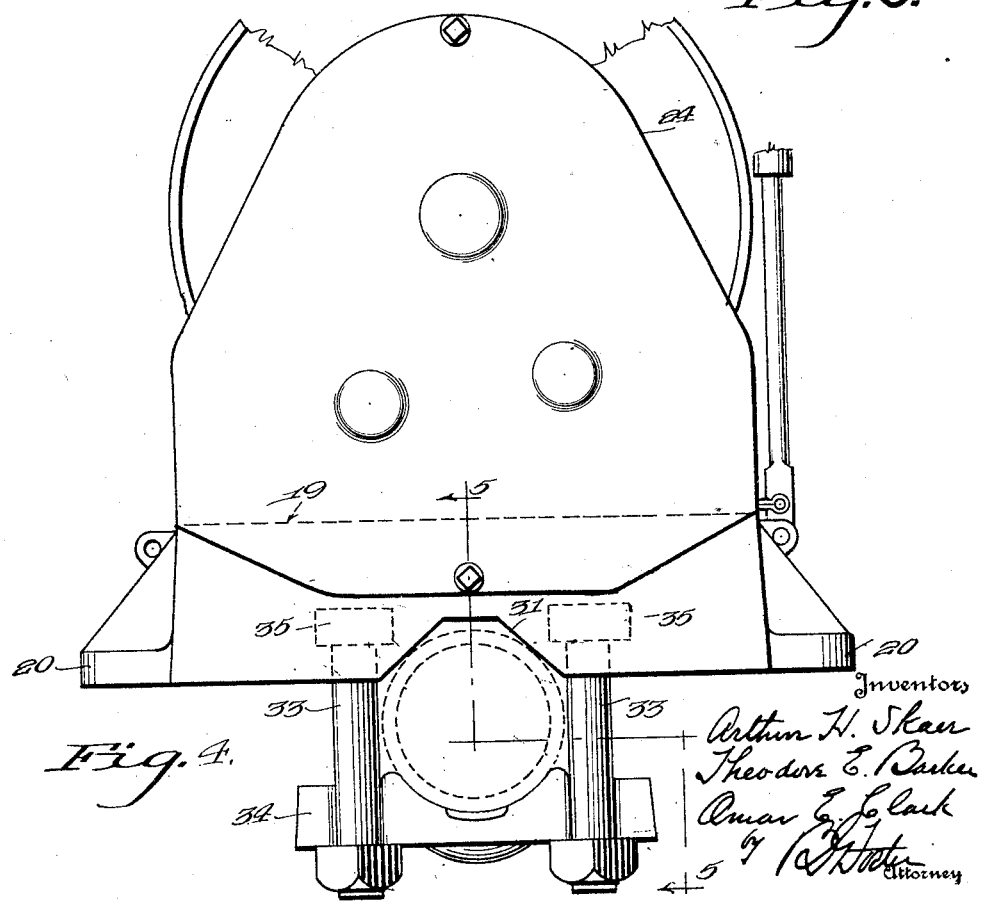

Figure 4 is an end view showing the carrier member mounted on a column or column arm, Figure 5 is a detail sectional view of the base member taken on the line 5—5 of Figure 4, Figures 6 and 7 are detail sectional views taken respectively on the line 6—6 and 7—7 of Figure 2, Figure 8 is a detail sectional view taken on the line 8—8 of Figure 3.

In the embodiment disclosed, a bed member or plate 9 is provided that is generally rectangular in form, and has a circular boss 10 on its upper side, providing corners or ears 11, perforated as shown at 12, to receive fastening bolts. The boss 10 carries a central upstanding annular flange forming a tubular spindle 13 surrounded by a circular undercut groove 14 that is concentric to said spindle. This groove is provided at diametrically opposite faces with openings 15 extending through its bottom, through which openings can be passed the heads 16 of holding and clamping bolts 17 that are slidably engaged in the undercut portion of the groove 14. The bosses 10 on opposite sides of said groove are provided with circular flat bearing faces 18.

Figure 1:
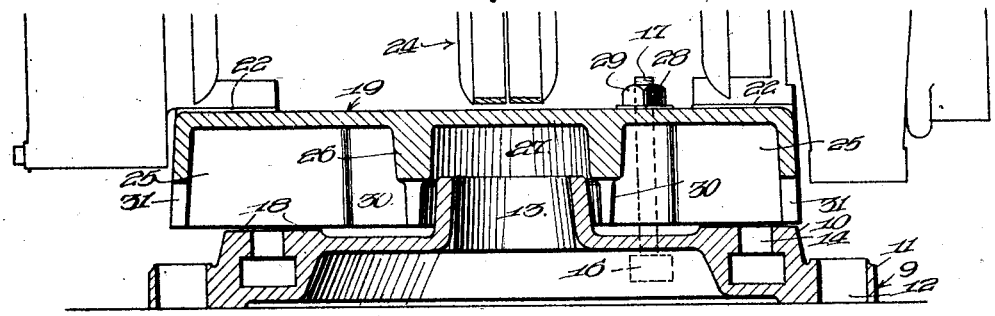
Figure 1 is a vertical sectional view through the mounting.

A rotatable carrier member in the form of a base plate 19 is adapted to be mounted upon the bed plate and is of generally rectangular form, having ears 20 at its corners that are perforated as shown at 21, so that this member 19 can be secured to a base or support, if desired. It is also provided at the corners with bearing faces 22 having bolt-holes 23. A winding drum indicated generally at 24 (and which may be of any desired character) is adapted to be mounted on the carrier member 19 and suitably secured by bolts or other fasteners passing through the holes 23. The underside of the carrier member is reenforced by suitable ribs 25 terminating at their inner ends in a circular wall 26 forming a socket or annular guideway 27 that receives the upwardly extending flange or spindle 13, as illustrated in Figure 1, so that the carrier member 19 can be rotatably mounted on the base member and will bear upon the trackways 18. The bolts 17, the heads of which are slidable in the undercut groove 14, pass through openings 28 in the carrier member 19, and nuts 29 on said bolts, bearing upon the base plate member, serve to hold the two members in associated relation, and when tightened, will hold said members against relative rotation.

The walls 26, forming the socket 27, are provided with sets of diametrically opposite notches or recesses 30, and the end walls of the base plate member having alined notches 31. These provide seats in which a column arm, indicated at 32 may be engaged when the carrier member is detached from the base member. The arrangement is shown particularly in Figures 4 and 5. When thus employed the base plate member is secured by clamps, comprising bolts 33 that are located on opposite sides of the column or column arm and are connected by cross pieces 34 located below said column or column arm and engaged therewith. These bolts 33 have heads 35 that are detachably mounted in open sided recesses 36, shown in Figures 6 and 7 formed at the juncture of the reenforcing ribs 25 and circular wall 26.

With this construction, it will be evident that the winding drum 24, or other instrumentality, may be mounted on the base plate member 19. The base plate member may be rotatably mounted on the base member 9, which is secured to a suitable holding support, and the drum or other machine can thus be rotated and clamped in any desired position. The base plate member may also be disengaged from the bed plate member 9 and individually fixed upon a support by bolts or other fasteners passed through the openings 21 and ears 20, or said base plate member 19 can be mounted on a column arm or column by placing the bolts 33 in position and utilizing the cross bars 34 to form a well-known type of clamp.

From the foregoing it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention

Having thus fully described our invention, what we claim as new, and desire to secure by Letters Patent, is:

1. In a hoist, the combination of a base plate having an annular guideway, a bed plate, an upwardly extending annular flange on said bed plate cooperating with said guideway and adapted to enable said base plate to be rotated about said upwardly extending flange, and means rotatable with the base plate to prevent unseating of the base plate and for clamping said bed plate and base plate together against rotation.

2. In a hoist the combination of a base plate having an annular guideway, a bed plate, and an upwardly extending annular flange on said bed plate cooperating with said guideway and adapted to enable said base plate to be rotated relative to said bed plate, said base plate being formed with a plurality of holes adapted to receive bolts to enable said base plate to be clamped to said bed plate, a flat support and the like.

In testimony whereof, we affix our signatures.

ARTHUR H. SKAER.
THEODORE E. BARKER.
OMAR E. CLARK.